(12) United States Patent
Horiki

(10) Patent No.: US 6,477,040 B2
(45) Date of Patent: Nov. 5, 2002

(54) PORTABLE INFORMATION PROCESSING DEVICE HAVING INPUT UNIT

(75) Inventor: Toshio Horiki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/842,651

(22) Filed: Apr. 27, 2001

(65) Prior Publication Data

US 2002/0109965 A1 Aug. 15, 2002

(30) Foreign Application Priority Data

Feb. 15, 2001 (JP) .................................. 2001-038051

(51) Int. Cl.⁷ ................................................ H05K 5/00
(52) U.S. Cl. ..................... 361/683; 361/725; 312/223.7; 364/708.1
(58) Field of Search ......................... 361/683, 724–727, 361/684–686, 680–681; 312/223.1–223.6, 223.7; 364/708.1

(56) References Cited

U.S. PATENT DOCUMENTS

| 5,548,477 | A | * | 8/1996 | Kumar et al. ................ 361/680 |
| 5,973,915 | A | * | 10/1999 | Evans ......................... 361/681 |
| 6,052,624 | A | * | 4/2000 | Mann ........................... 607/46 |
| 6,072,468 | A | * | 6/2000 | Hocker et al. ............... 345/157 |
| 6,109,039 | A | * | 8/2000 | Hougham et al. ............. 62/3.7 |
| 6,137,479 | A | * | 10/2000 | Olsen et al. ................. 345/169 |
| 6,141,667 | A | * | 10/2000 | Duff ............................ 708/100 |
| 6,192,258 | B1 | * | 2/2001 | Kamada et al. ............. 455/566 |
| 6,335,726 | B1 | * | 1/2002 | Ilan et al. ................... 345/173 |

* cited by examiner

Primary Examiner—Darren Schuberg
Assistant Examiner—Hung Van Duong
(74) Attorney, Agent, or Firm—Wenderoth, Lind & Ponack, L.L.P.

(57) ABSTRACT

There comprises a base unit having an information processing circuit and a display unit, an input unit, and a rotary axis disposed in an orthogonal direction to the base unit and the input unit for coupling therebetween. The display unit comes into an unexposed position when the input unit is turned in one direction on the rotary axis, and (ii) it comes into an exposed position when the input unit is turned in another direction on the rotary axis.

19 Claims, 11 Drawing Sheets

PORTABLE INFORMATION PROCESSING DEVICE HAVING INPUT UNIT

BACKGROUND OF THE INVENTION

1. Field of the Invention

The present invention relates to a portable, especially pocketable, information processing device, or the so-called PDA (Personal Digital Assistant).

2. Description of the Related Art

There is an increasing prevalence in recent years of portable information processors, or the devices called PDA's in particular. They are equipped with input devices and liquid crystal displays in a moderate size suitable for being carried in a breast pocket. Since any of these devices is unable to include a keyboard of sufficient size for fingers as an input device, so it is operated with a pen-like pointing device to move a cursor on a display screen. Furthermore, it is general to use the pointing device for not only pointing information displayed on the screen, but also inputting characters, numerals and symbols.

For the purpose of inputting characters, etc. with a pen-like pointing device, however, it is necessary to allot a part of display screen area to an input area for the characters. Consequently, this allotment further reduces an area for displaying an output within the display screen, which is smaller in itself than those of notebook personal computers. This limits an amount of the output information that can be displayed at a time, thereby making the display screen difficult for the operator to use.

To alleviate this problem, one manufacturer, for instance, provides some of his PDA products with key switches for key-input, besides a portion occupied by the liquid crystal display. Even with this instance, however, there still remains a problem of erroneous input resulting from adjacent keys being pushed by a finger simultaneously, because a pitch of the key switches is very tight.

For such a portable information processor as described above, a display device is generally oriented vertical. This consequently makes the main body a vertically oblong configuration. On the other hand, if the key switches on the keyboard are designed to have a certain interval of key pitch, it is desirable that the input device is shaped laterally oblong, like a keyboard of personal computer. Further, if the display device is arranged to be laterally oblong to match with a width of the input device, a vertical dimension of the display screen becomes small. Therefore, a long sentence is displayed horizontally lengthily, and thereby it makes be difficult for operator to read through the sentence within one screen.

SUMMARY OF THE INVENTION

An object of the present invention is to obviate the above-described problem, and to provide a portable information processing device of outstanding operability for key inputs, with an improved portability by making an input device foldable into a small To achieve this object, the portable information processing device of this invention comprises:

(a) a base unit which includes a display unit;
(b) an input unit; and
(c) a rotary axis disposed in an orthogonal direction to the base unit and the input unit, for coupling therebetween, wherein:

(i) the display unit locates in an unexposed position when the input unit is turned in one direction on the rotary axis; and
(ii) the display unit locates in a sufficiently exposed position when the input unit is turned in another direction on the rotary axis.

DETAILED DESCRIPTION OF THE PREFERRED EMBODIMENTS

Portable information processing devices of exemplary embodiments of the present invention will be described hereinafter with reference to FIG. 1 through FIG. 11.

Figure 1A:
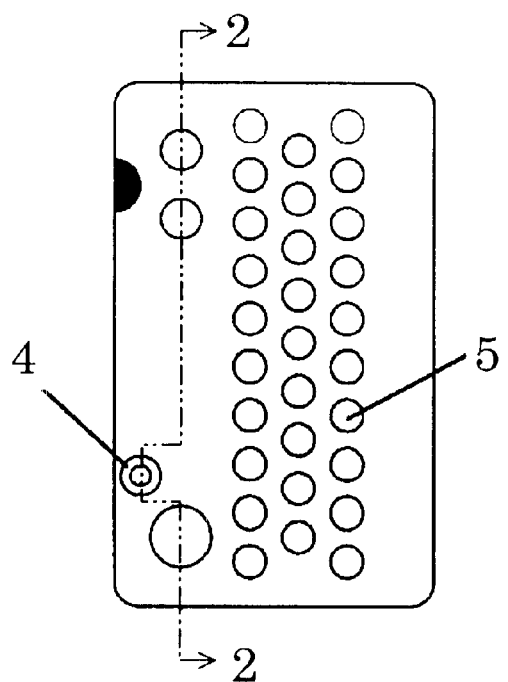
FIG. 1A is a front view of a portable information processing device of an exemplary embodiment of the present invention, with a display unit closed in an unexposed position.
Figure 1B:
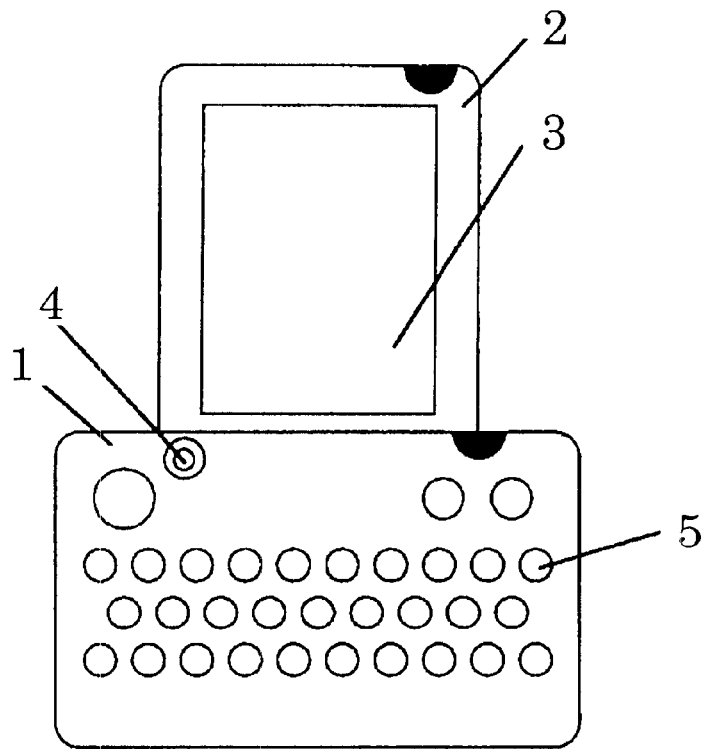
FIG. 1B is a front view of the same with the display unit opened in an exposed position.
Figure 2:
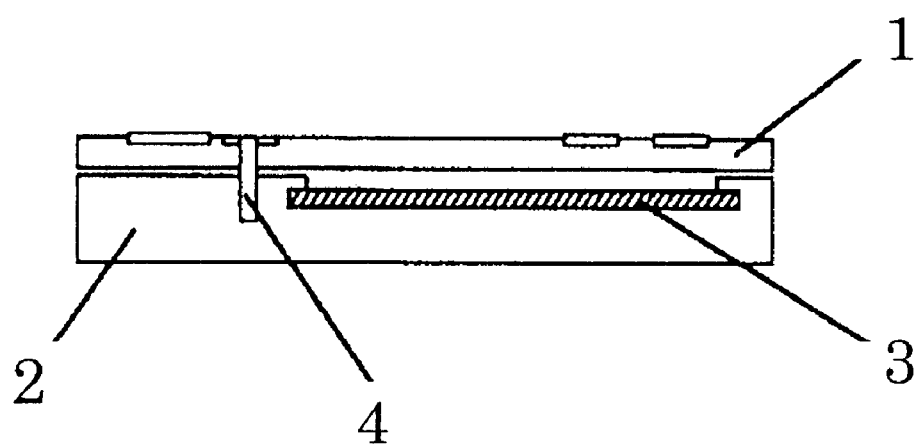
FIG. 2 is a cross section of the portable information processing device taken along a line 2—2 shown in FIG. 1A.

FIG. 1 is a configuration of a portable information processing device of an embodied example of the present invention, in which FIG. 1A shows a front view with its display unit closed in an unexposed position, and FIG. 1B shows another front view with its display unit opened in an exposed position. FIG. 2 is a cross section taken along a line 2—2 in FIG. 1A.

In FIG. 1A and 1B, an input unit 1 is a device for inputting characters, symbols, and numerals. A base unit 2 contains an information processing circuit including a central processing unit, a memory device, and a battery to operate them, and the like. The base unit 2 is provided on its front surface with a display unit 3 for displaying information. The input unit 1 and the base unit 2 are connected with a rotary axis 4 and bearings at its both sides in such a manner that an angle between them is changeable.

In the case here illustrated, the display unit 3 may be equipped with a liquid crystal display, an electroluminescence display, or the like. There are switches 5 corresponding to characters, symbols and numerals arranged on a front surface of the input unit 1 in a matrix arrangement as shown in the figures. Symbols of the characters, symbols, and numerals (not shown in the figures) are marked in their corresponding positions on the switches 5. An operator touches or pushes an upper surface of any of the switches 5 with a finger or a tip of a stick such as a pen so as to input any of the characters, symbols, and numerals. The characters are arranged in a manner, for instance, corresponding with such an array of the keyboard generally used for personal computer as the QWERTY arrangement. If a space between any adjoining buttons of the switches 5 is too narrow, there increases a possibility for the operator to input erroneous information, since he/she may pushes some of the adjoining buttons simultaneously when pushing one of the switches 5. It is therefore preferable to arrange the space between adjoining buttons of the switches 5 as wide as possible. In the case of the QWERTY arrangement, a laterally oblong configuration is desirable, since the lateral array can arrange a larger number of keys in a row than the vertical array. Accordingly, the input unit 1 is shaped laterally oblong in this exemplary embodiment.

The display unit 3 is mounted to the base unit 2. The base unit 2 is made in such a size that is larger than a size of the display unit 3 only by a margin occupied by a driving circuit of the display unit 3. The display unit 3 is desirable as large in a size as possible. In addition, it is preferable to choose one having such a shape as square or vertically oblong slightly. If a screen of the display unit 3 is laterally too wide, it requires eyes to make a large horizontal movement at an end of every line when laterally written sentences are displayed, thereby making the sentences hard to read. Use of the display unit 3 with a vertically oblong screen allows a display of many lines simultaneously across the vertical direction when laterally written sentences are displayed. This reduces the horizontal movement of eyes at ends of the lines, thereby making the sentences easy to read at a glance. For the above reason, the portable information processing device of this invention will be described herein using a vertically oblong display unit 3 as an example. When vertically-written sentences are displayed, it is a matter of course that these sentences become easy to read at a glance if the screen of the display unit 3 is laterally wide, since it reduces the vertical movement of eyes at bottom ends of the lines. By using the display unit 3 with laterally oblong screen to display many lines simultaneously across the lateral direction, the vertically written sentences can be made easy to read, as needless to mention.

In this exemplary embodiment, there is achieved an advantage that input of characters is made easy when in use, while improving portability when stored. For this purpose, the input unit 1 is turned on the rotary axis 4 and its bearing, to store the display unit 3 in a manner so that it is concealed by the input unit 1 as shown in FIG. 2, when the portable information processing device is not in use. If the input unit 1 is formed in a shape that matches to that of the display unit 3, they fit well when stored. The display unit 3 is covered by the input unit 1 under this condition. Because the input unit 1 is in such a positional relation as to protect the liquid crystal display 3, it can prevent the liquid crystal display 3 from being damaged by a mechanical impact, when they are carried in a bag or pocket.

Figure 3:
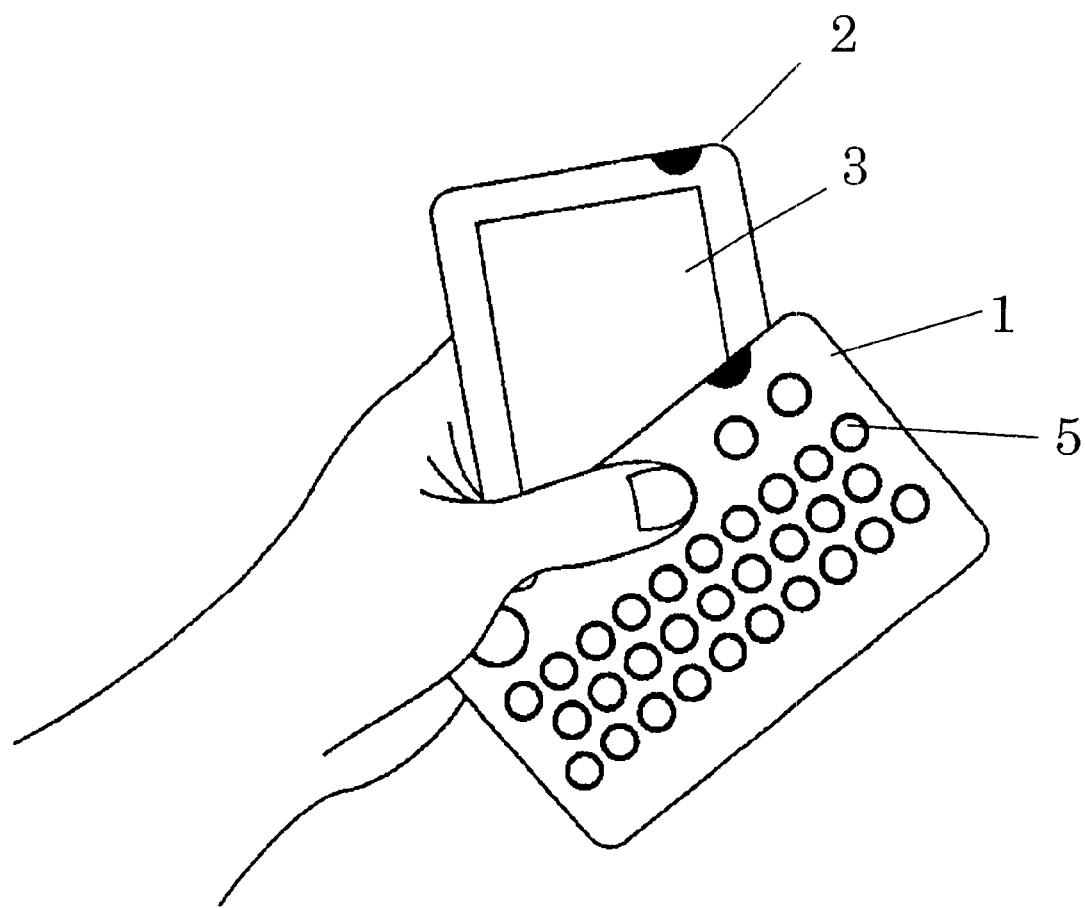
FIG. 3 shows a portable information processing device in a state in which the display device is being opened and closed, in an exemplary embodiment of the present invention.
Figure 4:
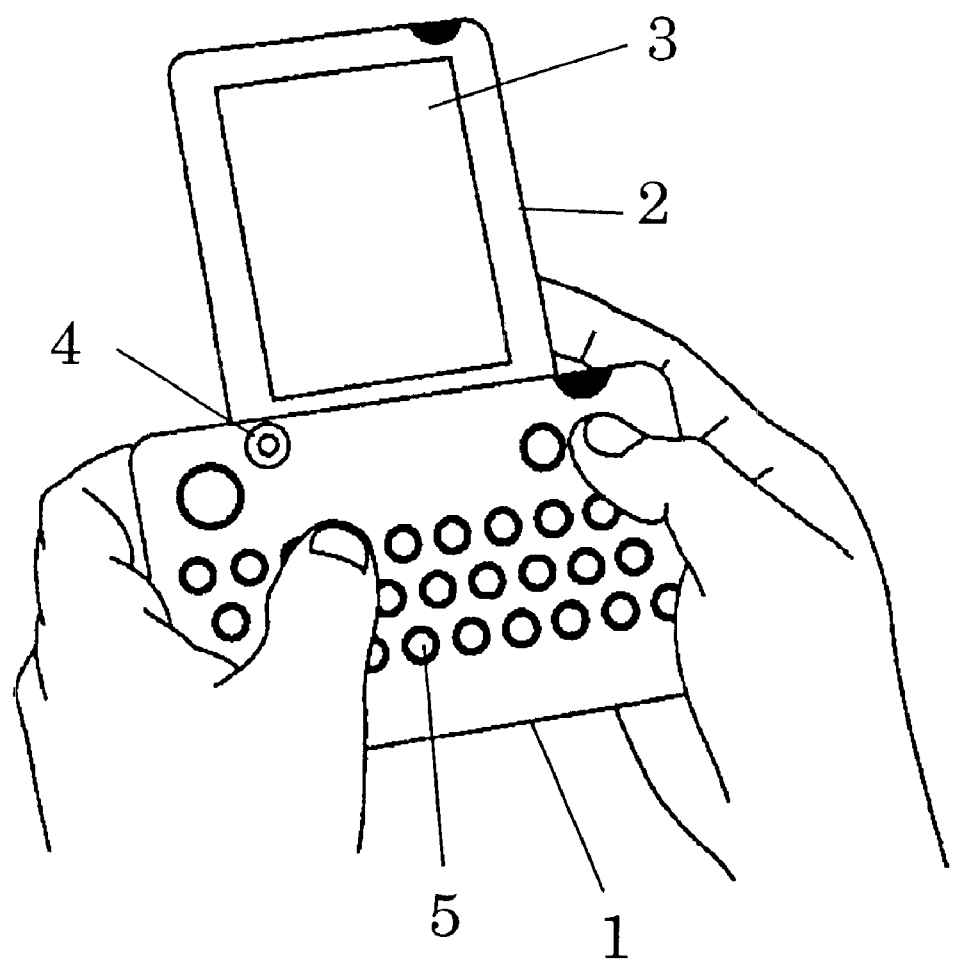
FIG. 4 shows the same in another state in which it is being used with the display unit in the open position.

FIG. 3 shows the portable information processing device in a state midst of an operation in which an operator is opening and closing the input unit 1 while holding it only with the left hand. FIG. 4 shows the portable information processing device in another state in which the operator has opened to expose the display unit 3, and he pushes buttons of the input unit 1 with one hand or both hands to input information while looking at the screen of the display unit 3.

The input unit 1 is turned on the rotary axis 4 and on its bearing to expose the display unit 3. The rotary axis 4 and the bearing are provided at a front left position of the display unit 3, as an example, so that they can be in such a positional relation that a lateral center line of the display unit 3 and a lateral center line of the input unit 1 are generally in line with each other. Since the display unit 3 is located in the direct front of the operator when he/she inputs information while holding the portable information processing device in his/her both hands, it is easy to look at, and outstanding in operability. Naturally, there may be circumstances in that the rotary axis 4 and the bearing are better placed at the front right position of the display unit 3 depending on a difference in handedness of the operator. In this exemplary embodiment, however, description hereinafter is the case that the rotary axis 4 and the bearing are placed at the front left position of the display unit 3, as shown in the individual figures.

Since the portable information processing device of this exemplary embodiment is of a small size, it allows opening and closing manipulation only with one hand as shown in FIG. 3. When opened, it also allows the operator to operate while looking at the screen as shown in FIG. 4. Accordingly, it has the advantage of outstanding operability because the input unit and the liquid crystal display show their full faces when in use.

Figure 5A:
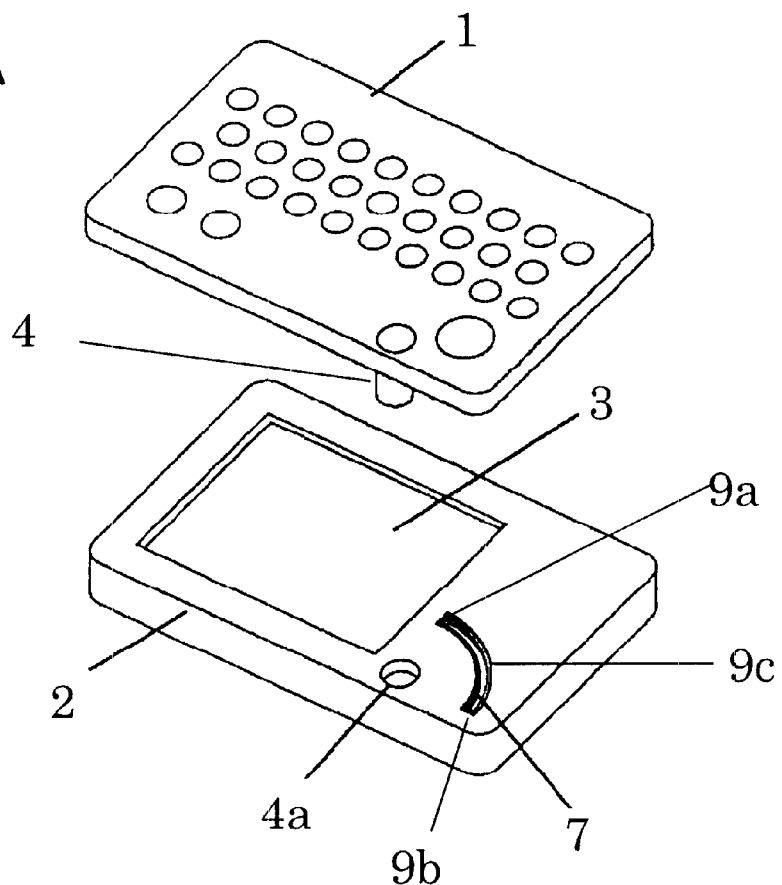
FIG. 5A is an perspective view of the same, showing a structure that limits a rotational angle of the display unit.
Figure 5B:
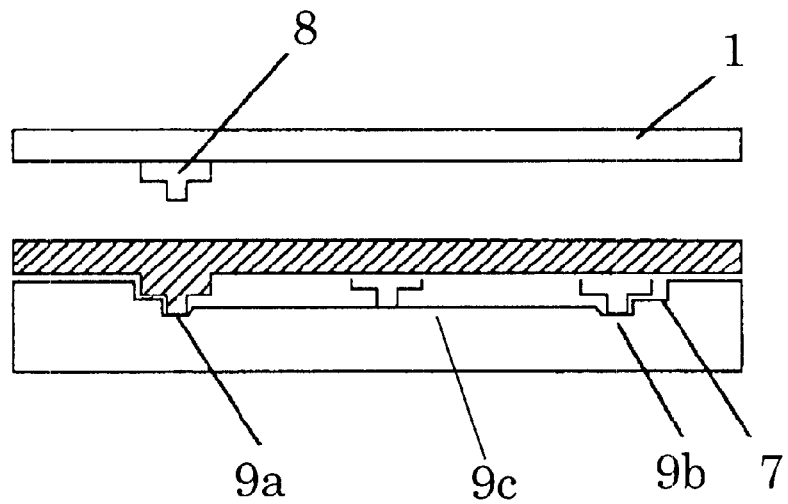
FIG. 5B is cross section of the same, showing the structure that limits the rotational angle of the display unit.

FIG. 5A is a perspective view showing a structure that limits a rotational angle, and FIG. 5B is cross section of a guide groove 7 showing the structure for limiting the rotational angle.

Following description relates to an adjustment of the rotary axis 4 and the rotational angle. When assembled, the rotary axis 4 is engaged with a rotary bearing 4a. As one embodied example in this invention, the input unit 1 is rotated by 90° relative to the display unit 3, or to the base unit 2. Naturally, this rotational angle can be set for any angle such as 75°, 120°, and so forth instead of 90°, depending on habit of the individual operator, and it ban be made adjustable for such angle. For convenience' sake, description will be given here for the rotational angle of 90°. The display unit 3 is set at either a fully opened position, or a completely closed position.

A method of limiting the rotational angle is described now according to FIG. 5.

The guide groove 7 forms a circular arc of 90° to the center of the rotary bearing 4a, and it comprises a tailing end recess 9a located at one end, a starting end recess 9b located at the other end, and a guide channel 9c of a circular arc of 90° coupling between these recesses. The circularly arced guide channel 9c is shallower than the recesses 9a and 9b. A depth of this circularly arced guide channel 9c is sloped from the depth of the guide channel 9c toward depth of the starting end recesses 9b and toward depth of the tailing end recesses 9a, in the vicinity of the recesses 9b and the recesses 9a, respectively, as shown in FIG. 5B. The input unit 1 is provided on its back surface with a projection 8 which engages in the guide groove 7 and the projection 8 slidingly moves along the guide groove 7. The circularly arced guide channel 9c is formed shallower than a height of the projection 8. On the other hand, the depths of the recesses 9a and 9b at two ends of the guide groove 7 are equal to the height of the projection 8. When the display unit 3 is closed underneath the input unit 1, the projection 8 is engaged the starting end recess 9b located at one end of the guide groove 7. Under this condition, the display unit 3 is stably retained in the closed position since the projection 8 does not move with a weak force because of the engagement of the projection 8 and the starting end recess 9b. In this case, the stably retained condition is realized by a precise engagement of the projection 8 and the starting end recess 9b.

Next, when the operator put a force to move the input unit 1 clockwise by a thumb of his/her left hand, and the base unit 2 counterclockwise by other fingers of the left hand, as shown in FIG. 3, the projection 8 climbs over the starting end recess 9b through the slope and moves slidingly along the circularly arced channel 9c in the guide groove 7. During this movement, the input unit 1 stays slightly lifted because the height of the projection 8 is larger than the depth of the guide channel 9c. When the projection 8 is turned thereafter to 90°, it passes through another slope in the guide channel 9c, and then it finally engages the tailing end recess 9a located at the other end, so as to retain the information processing device in this stable position at the recess 9a. The stable position is achieved by a precise engagement of the projection 8 and the tailing end recess 9a. Consequently, the input unit 1 holds stably the liquid crystal display 3 in the open position or in the closed position by the foregoing structure.

Although the above embodiment illustrated in FIG. 1, FIG. 2, and FIG. 5 show the case in which the display unit 3 is united with the base unit 2 in a one body, but instead the input unit 1 may be united with the base unit 2 in a one body.

Figure 6:
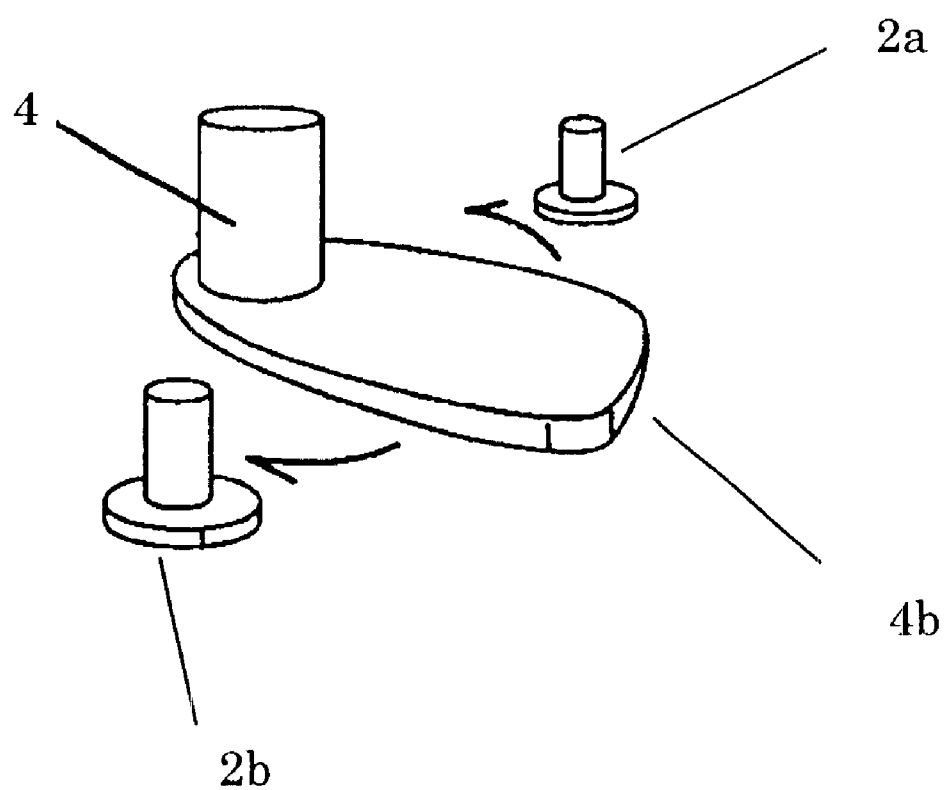
FIG. 6 shows a portion of another structure that limits the rotational angle of the display unit.

FIG. 6 shows a portion representing another method for limiting the rotational angle. This FIG. 6 is a perspective view showing a portion around the rotary axis 4 relating to a side of the base unit 2. The rotary axis 4 is provided with a lever-like bar plate 4b orthogonally to its axis. This bar plate 4b is fixed to the back surface of the input unit 1 together with the rotary axis 4. On the other hand, the base unit 2 is provided with two bar-shaped projections 2a and 2b in place of the guide groove 7 of FIG. 5A. The bar plate 4b rotates together with the input unit 1, when the input unit 1 is turned with the rotary axis 4 inserted in the bearing 4a. The bar-shaped projections 2a and 2b provided on the base unit 2 restrict the rotational angle of the bar plate 4b.

Although there is wiring (not shown in the figures) within the rotary axis or the vicinity thereof for electronic connection between the input unit 1 and an electronic circuit housed in the base unit 2, it is protected from being twisted, since the rotational angle of the input unit 1 is limited to 90° as above.

Figure 7:
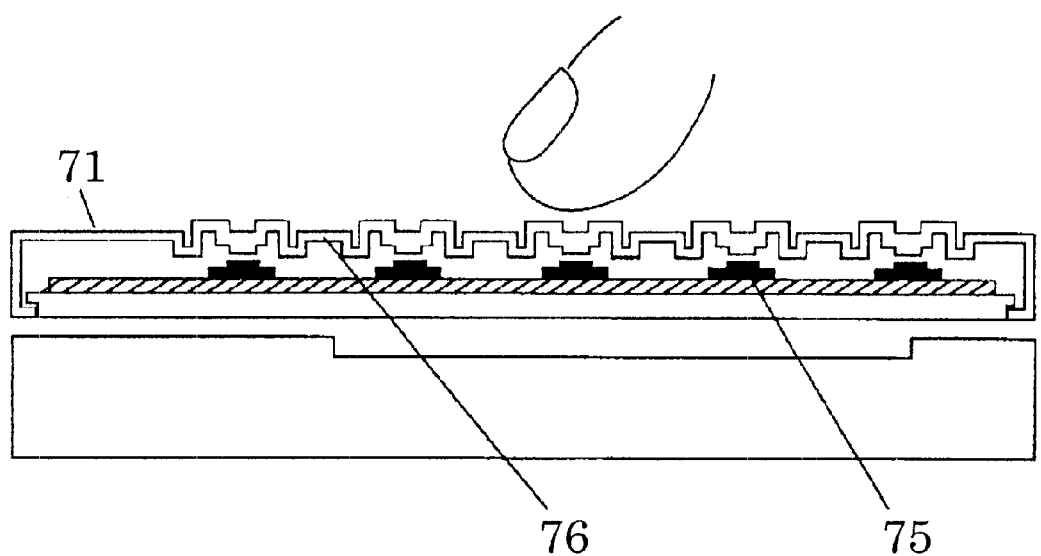
FIG. 7 shows a structure of an input unit of another exemplary embodiment of the present invention.

FIG. 7 shows, in cross section, a structure of another exemplary embodiment related to an input unit of the present invention. An input unit 71 comprises sheet-formed membrane switches 75, or so-called membrane, disposed in a matrix configuration for detecting a pressure, and an outer jacket formed of a flexible seamless elastomer cover 76 covering an upper surface of the switches 75. A surface of the elastomer cover 76 is printed with symbolic marks of characters, symbols, and numerals (not shown in the figure) indicating switches corresponding to those of the individual membrane switches 75. The elastomer cover 76 is so formed that it covers not only the upper surface but also side surfaces, and even around back of the input unit 71. Details of structure of the base unit 2 and a method of rotating the input unit 71 will be skipped, as they are similar to the exemplary embodiment described above.

With this exemplary embodiment, since the surfaces of the input unit 71 are covered with the seamless and flexible material, water drippings can be prevented from entering into it. Furthermore, a surface of the display unit 3 is covered by the input unit 71, in the case of the unexposed position, and the surfaces of the input unit 71 are covered by the elastomer cover 76, when being carried. Therefore, this configuration can reduce greatly any risk of damages to not only the portable information processing device in its entirety but also to the display unit 3, because mechanical impacts are alleviated even if it is dropped accidentally. Also this configuration can thus prevent the information processing device from damages due to careless handling while being carried. In addition, it is also possible to use the information processing device in such an environment subject to water drippings as rainy outdoors, since waterproofness is easily attainable in this configuration.

Figure 8:
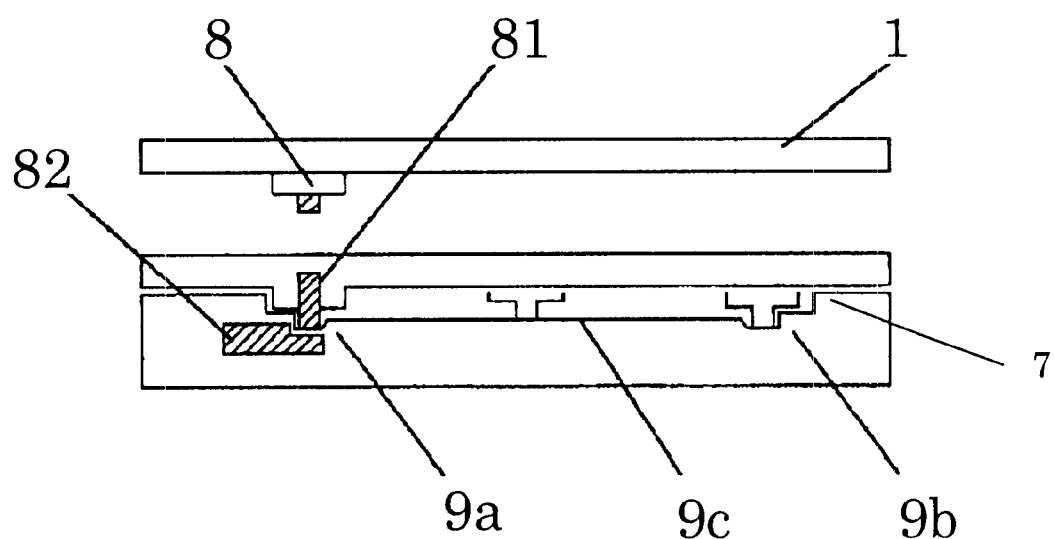
FIG. 8 shows a structure for detecting opening and closing of a display unit in still another exemplary embodiment of the present invention.

FIG. 8 shows a structure for detecting opening and closing of the display unit 3 in still another exemplary embodiment of the present invention. In FIG. 8, a device for detecting opening and closing of the display unit 3 comprises a magnet 81 provided in an interior or near the projection 8 assembled in the input unit 1, and an electromagnetic switch 82 assembled in the vicinity of a recess 9a in the base unit 2. Details will be skipped for other components than the above, as they are similar to those of the foregoing embodiments.

When the input unit 1 is turned sufficiently until the display unit 3 comes to its open position, the magnet 81 comes close to the electromagnetic switch (or, a magnet switch) 82 within an enclosure of the input unit 1 and another enclosure of the base unit 2 in the opposite side. This renders the electromagnetic switch 82 electrically conductive. At this moment, the electromagnetic switch 82 turns on a power supply in the portable information processing device to make it operative.

Then, the input unit 1 is turned from the operating position to put the display unit 3 back to the closed position. Since this movement shifts the projection 8 from the tailing end recess 9a to the starting end recess 9b through the guide groove 7, the magnet 81 also moves away from the electromagnetic switch 82. Consequently, the electromagnetic switch 82 turns into a cut-off state. Cut-off state of the electromagnetic switch 82 shuts off the power supply of the portable information processing device. The power supply may be cut off immediately power supply to the electronic circuit functioning as an information processing circuit. Or, upon cutting off the electromagnetic switch 82, the power supply to the electronic circuit, i.e. the information processing circuit, may be cut off just after the data-in-process has been stored in an nonvolatile memory such as a flash memory, so that the data will not be lost erroneously. The electromagnetic switch may be comprised of a reed relay or the like.

In addition, the input unit 1 and the base unit 2 are capable of transmitting and receiving data therebetween via radio communication units. With such means, it is easy to further improve the waterproofing property. In this case, transmission and reception of the data can be made with a feeble radiation power regardless of whether the radio communication units use radio waves or infrared rays for the wireless transmission, because the input unit 1 and the base unit 2 are used very close to each other.

Since the input unit 1 and the display unit 3 are not used when they are closed, the power supply to the electronic circuit is shut off when they are in the closed position. Because supply of the power is shut off automatically when not in use, this system provides an advantage of avoiding wasteful consumption of a battery due to carelessness. Accordingly, a useful life of the battery operation in the portable information processing device can be prolonged significantly.

Figure 9:
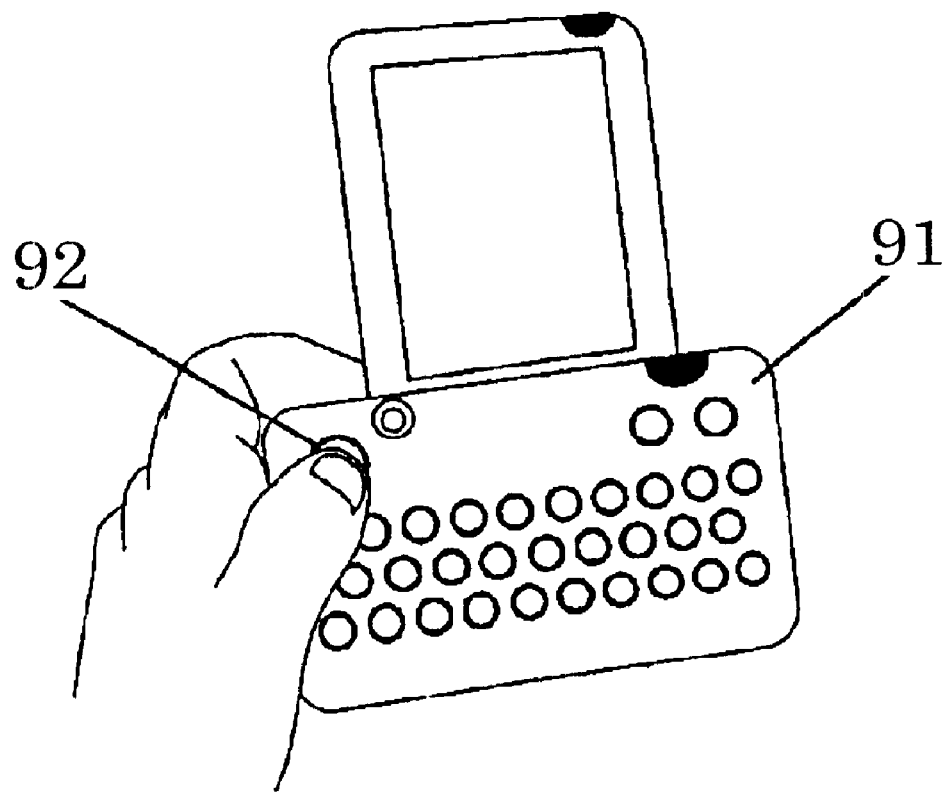
FIG. 9 shows a structure provided with a pointing device having such shape as a ball form or a flat pad as a supplementary input unit besides the keyboard in the exemplary embodiment of this invention.
Figure 10:
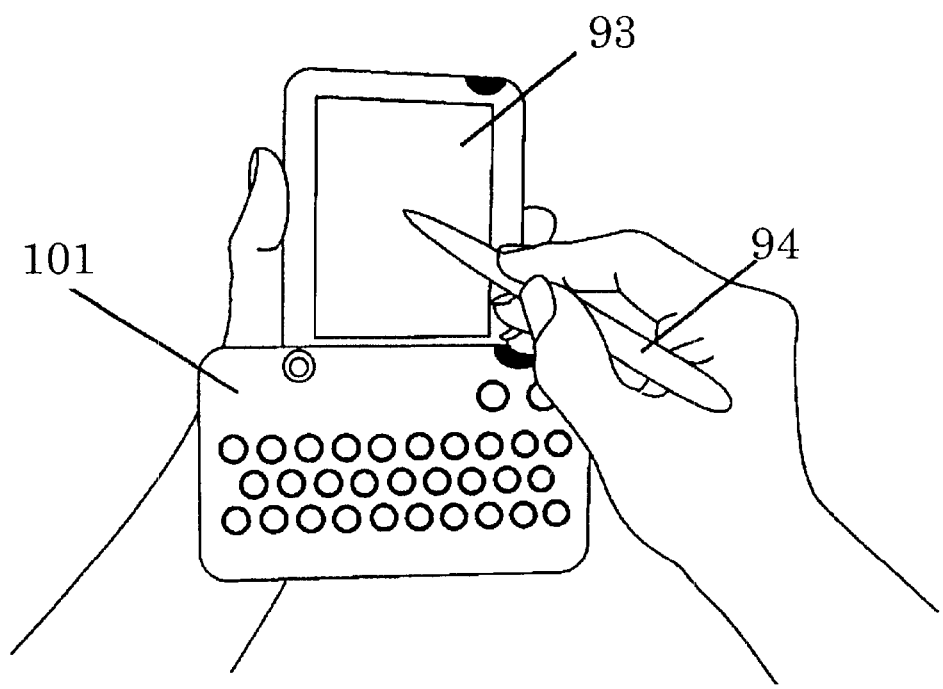
FIG. 10 shows yet another exemplary embodiment of this invention, in which a touch panel is provided as a supplementary input unit besides the keyboard.

FIG. 9 shows still another exemplary embodiment of this invention, representing a structure provided with a pointing device in such configuration as a ball form or a flat pad so called smart pointer, as a supplementary input unit besides a keyboard. FIG. 10 shows yet another exemplary embodiment of this invention, in which a touch panel 93 is provided as a supplementary input unit in addition to the keyboard.

In FIG. 9, an input unit 91 is provided with a pointing device 92 such as a ball form so called track-ball or a flat pad so called smart pointer, as a supplementary input unit besides the keyboard. This pointing device functions like a mouse used with a personal computer. Or, it functions as ajoystick used with a game machine. The pointing device 92 is disposed on an upper left area of the input unit 91, where is near a rotary axis 4, as an example. Details of other features will be skipped, as they are similar to the above-described exemplary embodiments.

The pointing device 92 can be any devices of a bar configuration tiltable in a free direction like a joy stick, a ball form rotatable in a free direction like a track ball, a flat pad form operable with a finger moved along any of two-dimensional direction like a smart pointer, and the like. When the portable information processing device is held in the left hand as shown in FIG. 9, the pointing device 92 is located just about a position of the thumb. This location therefore allows the thumb to manipulate the pointing device 92 while also holding the portable information processing device with the left hand. In addition, this location also makes the left hand possible manipulation of the pointing device 92 as well as makes the right hand operate inputting characters at the same time, since the right hand is also available to use for the character input. In short, this portable information processing device has the advantage of allowing the character input and the pointing manipulation at the same time.

Similar effect is also achievable when the pointing device 92 is disposed at a position laterally symmetrical to that of FIG. 9, so that the pointing device is manipulated by the right hand, and characters are input by the left hand.

FIG. 10 is a front view showing an example provided with a touch panel. A display unit 3 is provided with a touch panel 93 on its front surface. Pointing manipulation is carried out with a touch pen 94 in either the right hand or the left hand while holding the portable information processing device with the left hand or the right hand.

Figure 11:
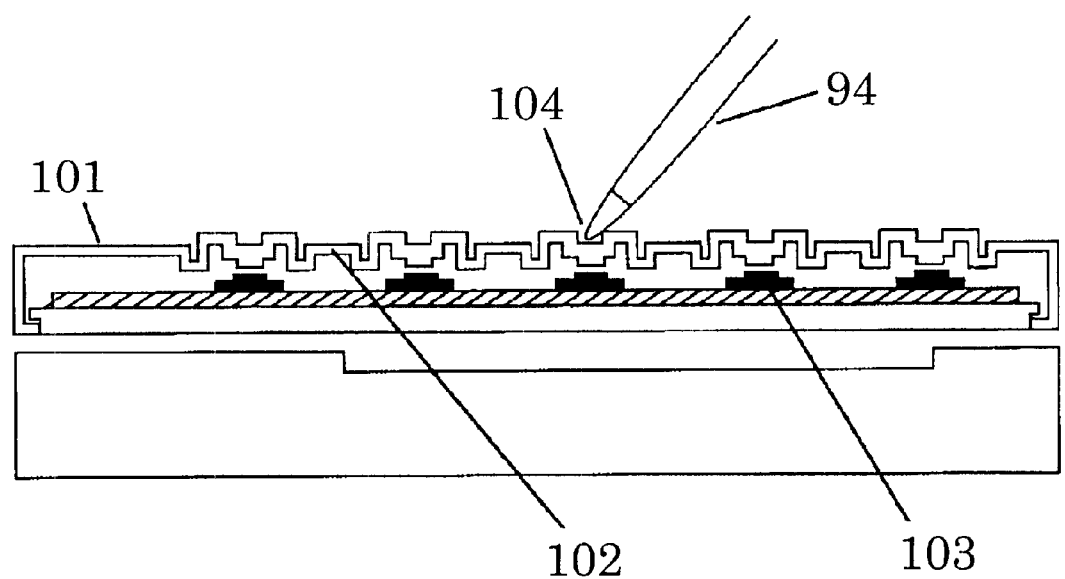
FIG. 11 shows still another exemplary embodiment of this invention, in which inputs to the keyboard is made with a pen-like stick.

FIG. 11 shows still another exemplary embodiment of this invention, in which input to a keyboard is carried out with a pen-like stick. It is a cross section showing specifically the input unit of FIG. 10.

A surface of an input unit 101 is covered with a seamless elastomer cover 102. The elastomer cover 102 is provided with depressions 104 in portions covering membrane switches 103. The touch panel 93 is operated with a special-purpose touch pen 94. This touch pen 94 is used to operate not only the touch panel 93 of FIG. 10 but also the input unit 101, which corresponds to a keyboard. When the touch pen 94 is used to manipulate the input unit 101 as shown in the cross section of the input unit in FIG. 11, its penpoint fits well in the depressions 104 provided in the elastomer cover 102, thereby ensuring the entry, and preventing an erroneous input. In addition, since waterproofness is easily attainable with the elastomer cover 102, the input unit 101 provides an advantage of making it possible to use in such an environment subject to water drippings as rainy outdoors.

As has been described, the present invention provides the following advantageous effects because of the structure, in which the display is kept concealed with the input unit when not in use and stored, or it is used with the input unit rotated to set it into laterally oblong position when in use.

1) The input unit material also serving as a display panel has a function of protecting a surface of the display unit such as a liquid crystal from pressure and impact when in storage. Notably, a high resistance to impact is achieved for the surface of the input unit using such a material as elastomer.

2) The input unit becomes laterally oblong when in use, so as to allow a large space between keys on the keyboard. This facilitates input of characters and so forth, and reduces erroneous inputs.

3) The input unit can be opened and closed by rotating it with one hand that holds the main unit, since the input unit and the base unit are coupled with the orthogonally disposed rotary axis.

4) In addition, it avoids unnecessary consumption of the battery, because the power supply can be turned off automatically when not in use, by detecting a rotational angle of the input unit to carry out an on-off control of the power supply.

What is claimed is:

1. A portable information processing device comprising:
a base unit including a display unit;
an input unit;
a rotary axis disposed in an orthogonal direction to said base unit and said input unit, for coupling therebetween,
wherein
said display unit is in an unexposed position when said input unit is turned in one direction on said rotary axis, and
said display unit is in a sufficiently exposed position when said input unit is turned in another direction on said rotary axis; and
a detection element for detecting an exposed position of said display unit, wherein, when said input unit and said display unit are turned on said rotary axis,
said detection element turns on a power supply for said portable information processing device upon detection that said display unit is sufficiently exposed, and
said detection element turns off the power supply for said portable information processing device upon detection that said display unit is not exposed sufficiently.

2. The portable information processing device as set forth in claim 1, wherein said detection element comprises a magnet switch.

3. The portable information processing device as set forth in claim 1, further having a waterproofing property.

4. The portable information processing device as set forth in claim 1, wherein a surface of said input unit is covered with a flexible and seamless material such as an elastomer.

5. The portable information processing device as set forth in claim 1, further comprising a wireless communication unit,
wherein said wireless communication unit communicates the information between said input unit and said base unit.

6. The portable information processing device as set forth in claim 1, wherein said input unit is provided with a pointing device for shifting positions of at least one of a cursor and a pointer, on a screen of said display unit.

7. The portable information processing device as set forth in claim 1, further comprising a touch panel in a front surface of said display unit, wherein information is input with any of a finger tip and a pen-like stick tip.

8. The portable information processing device as set forth in claim 6, wherein said pointing device comprises a flat pad.

9. The portable information processing device as set forth in claim 6, wherein said pointing device comprises a ball-shaped device.

10. The portable information processing device as set forth in claim 6, wherein said pointing device comprises a joystick-shaped device.

11. A portable information processing device comprising:
a display unit;
a base unit including an information processing circuit and being operably coupled to said display unit;
an input unit operably coupled to said base unit;
a rotary axis disposed in an orthogonal direction to said display unit and said input unit, for coupling therebetween,
wherein
said display unit is in an unexposed position when said input unit is turned in one direction on said rotary axis, and
said display unit is in a sufficiently exposed position when said input unit is turned in another direction on said rotary axis; and
a detection element for detecting an exposed position of said display unit, wherein, when said input unit and said display unit are turned on said rotary axis,
said detection element turns on a power supply for said portable information processing device upon detection that said display unit is sufficiently exposed, and
said detection element turns off the power supply for said portable information processing device upon detection that said display unit is not exposed sufficiently.

12. The portable information processing device as set forth in claim 11, wherein said detection element comprises a magnet switch.

13. The portable information processing device as set forth in claim 11, further having a waterproofing property.

14. The portable information processing device as set forth in claim 11, wherein a surface of said input unit is covered with a flexible and seamless material such as an elastomer.

15. The portable information processing device as set forth in claim 11, further comprising a wireless communication unit,
wherein said wireless communication unit communicates the information between said input unit and said base unit.

16. The portable information processing device as set forth in claim 11, wherein said input unit is provided with a pointing device for shifting positions of at least one of a cursor and a pointer, on a screen of said display unit.

17. The portable information processing device as set forth in claim 16, wherein said pointing device comprises a flat pad.

18. The portable information processing device as set forth in claim 16, wherein said pointing device comprises a ball-shaped device.

19. The portable information processing device as set forth in claim 11, further comprising a touch panel in a front surface of said display unit, wherein information is input with any of a finger tip and a pen-like stick tip.

\* \* \* \* \*